Figure 1A:
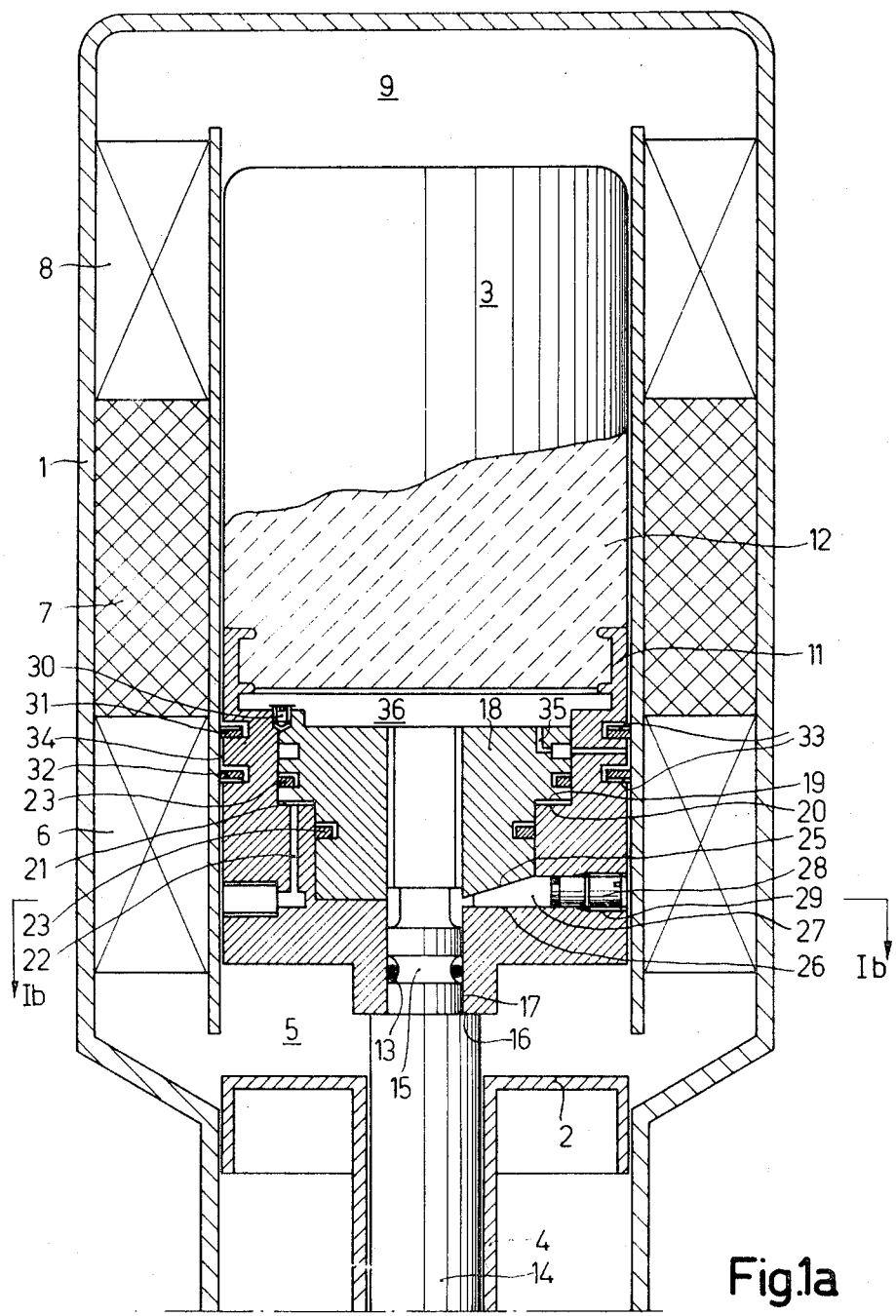

United States Patent [19]
DeLigny et al.

[11] 3,783,612
[45] Jan. 8, 1974

[54] HOT-GAS PISTON ENGINE

[75] Inventors: Johan Herman DeWilde DeLigny; Cornelis Leendert DeWit; Petrus Johannes Cornelius Van Rooij, all of Emmasingel, Eindhoven, Netherlands

[73] Assignee: U.S. Philips Corporation, New York, N.Y.

[22] Filed: May 24, 1972

[21] Appl. No.: 256,486

Related U.S. Application Data
[63] Continuation of Ser. No. 119,577, March 1, 1971, abandoned.

[30] Foreign Application Priority Data
Mar. 28, 1970  Netherlands .................. 7004499

[52] U.S. Cl. .................. 60/24, 92/128, 92/258, 92/259
[51] Int. Cl. .................................. F02g 1/04
[58] Field of Search .................. 92/128, 181, 258, 92/259; 60/24

[56] References Cited
UNITED STATES PATENTS
| | | | |
|---|---|---|---|
| 3,066,003 | 11/1962 | Thassy | 92/258 X |
| 3,155,014 | 11/1964 | Genz | 92/258 X |

*Primary Examiner*—Martin P. Schwadron
*Assistant Examiner*—Allen M. Ostrager
*Attorney*—Frank R. Trifari

[57] ABSTRACT

The invention relates to a hot-gas piston engine comprising at least one compression space of variable volume and at least one expansion space also of variable volume communicating with the former, said spaces having, in operation, relatively different temperatures, the volumes of these spaces being variable by means of pistons bodies, which are connected each via a piston rod with a driving gear, while at least the piston adapted to vary the volume of the expansion space is formed by a base element secured to the end of the piston rod concerned, said base element being provided on its side facing the expansion space with a heat-insulating piston cap.

1 Claim, 2 Drawing Figures

HOT-GAS PISTON ENGINE

This is a continuation, of application Ser. No. 119,577, filed 3/1/71 now abandoned.

Hot-gas piston engines of the kind set forth, which are to be understood to mean cold-gas refrigerators, hot-gas engines, cold-gas engines and heat pumps, are known. In order to avoid loss of heat or cold from the expansion space the piston varying the volume thereof in these engines is formed by a base element secured to the piston rod concerned and a hollow or solid heat-insulating cap arranged on said element. This piston cap provides a large axial dimension of the piston-like body.

The connection hitherto used between said piston-like body and the piston rod often gives rise to an inclined position of the piston-like body relative to the rod, which results in jamming of the body in the cylinder due to said large axial dimension.

A further disadvantage of the conventional method of connection resides in that the nut fastening the piston-like body to the rod is located inside the assembly of the basic element and the piston cap so that in dismounting and post-adjustment the piston cap has to be removed first.

The invention has for its object to provide a hot-gas piston engine of the kind set forth, in which said disadvantages are obviated.

The hot-gas piston engine according to the invention is for this purpose characterized in that the base element is provided with a bore located on its centre line and fitting centrally around part of the piston rod concerned, the side of the base element remote from the piston cap engaging a face of the piston rod which is at right angles to the centre line of said piston rod, the latter being prolonged in the direction of the piston cap by a narrowed portion, which is provided with screwthread at the ends for receiving a nut accommodated in a recess of the base element, the nut and the surrounding recess comprising two portions of different diameters, the parts of the larger diameter being located on the side of the piston cap, whilst the gap-shaped space between the annular faces formed by the transitions of said parts, which space is otherwise closed, can be caused to communicate with a high-pressure medium source through a communication channel passing through the base element and the side of the nut remote from the piston cap is provided with a plurality of radial slots distributed circumferentially and having depths decreasing inwardly in the radial direction, whilst the key-shaped grooves formed by said slots and the side of the base element facing the piston cap accommodates a fitting, key-shaped tightening element, which is displaceable in a radial direction in the groove by means of a bolt held in a radial, tapped bore in the base element.

In the hot-gas piston engine embodying the invention the perpendicular position is obtained by urging the base element against a face of the piston rod at right angles to the centre line thereof. For this purpose the piston rod is first subjected to bias stress preferably hydraulically by supplying the high-pressure medium to the gap between the annular faces of the nut and the base element so that forces in opposite directions are exerted on the nut and on the base element. Then the key-shaped tightening elements can be readily displaced inwardly to the desired extent by tightening the bolts, after which, when the high-pressure medium is conducted away, the key-shaped tightening elements continue urging away the nut from the base element so that the base element remains urged against the piston rod in the desired position. Post-adjustment and dismounting can be carried out in a simple manner without dismounting the piston cap by first subjecting the piston rod to a higher bias stress with the aid of the high-pressure medium and by subsequently handling the bolts. An inclined position of the nut, if any, is without consequence for the perpendicular position of the piston.

A satisfactory centering is ensured by the cylindrical portion of the piston rod located inside the bore of the base element.

The invention will be described more fully with reference to the drawing, which shows by way of example, a hot-gas piston engine of the displacer type diagrammatically.

Referring to FIG. 1a reference numeral 1 designates a cylinder in which a piston 2 and a displacer 3 are adapted to move. The piston 2 and the displacer 3 are connected by a piston rod 4 and a displacer rod 14 with a driving gear (not shown). Between the piston 2 and the displacer 3 the compression space 5 communicates through a cooler 6, a regenerator 7 and a heater 8 with an expansion space 9 above the displacer. A burner (not shown) is provided for the supply of heat to the expansion space 9.

The displacer 3 comprises a base element 11 and a solid displacer 12 of quartz or another material of poor thermal conductivity fastened to the former.

Figure 1B:
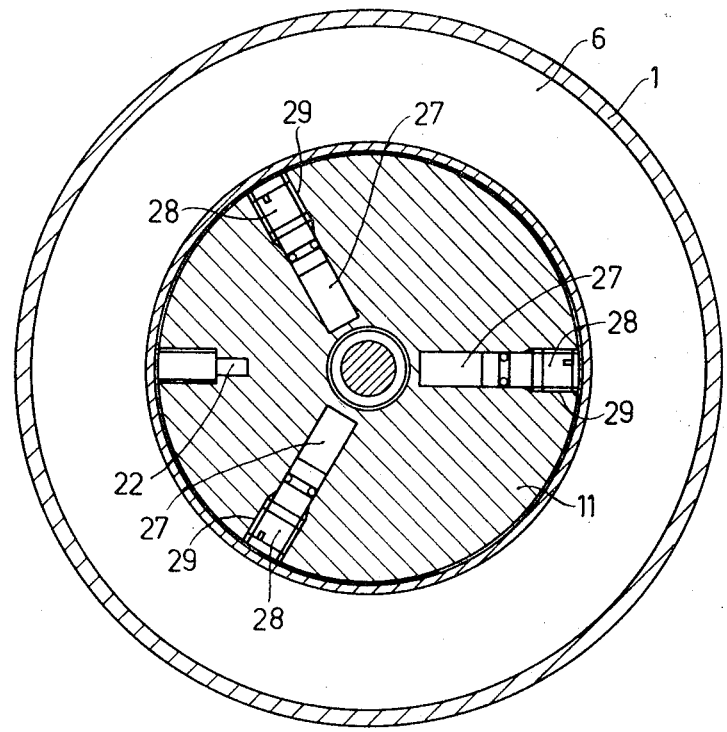

The base element 11 has a bore 13 adapted to receive the end 15 of the displacer rod 14. The end 15 has a face 16 at right angles to the centre line of the displacer rod 14 and a cylindrical fitting face 17 nearly held in the bore 13. In this way the perpendicular position and the central position of the displacer is ensured by two separate faces. The end 15 has furthermore a screwthreaded portion, on which a nut 18 is screwed, which is held in a recess of the base element between the annular faces 19 and 20 of the nut 18 and the base element 11 respectively a gap-shaped space 21 is left, which can be caused to communicate through a communication channel 22 with a pressurized oil source. The space 21 is sealed by stuffing rings 23. With respect to the base element 11 the nut 18 is fixed in position by means of a pin 30. Also from FIG. 1b, a cross sectional view Ib—Ib of FIG. 1a, it will be apparent that the nut 18 is provided on the lower side with three radial slots 25 at angles of 120° between each other, the depths of which decrease towards the piston rod in a radial direction. Together with the wall 26 of the base element 11 the slots 25 form key-shaped grooves accommodating key-shaped tightening elements 27, which are displaceable in a radial direction in the wedge-shaped grooves by means of bolts 28 held in radial, tapped bores 29 in the base element 11. By supplying pressurized oil via the communication channel 22 to the gap-shaped space 21 the nut 18 and the base element 11 are urged away from each other by the oil pressure exerted on the annular faces 19 and 20 so that the rod connection is subjected to preliminary stress. By tightening the bolts 28 the key-shaped tightening elements 27 can now be readily displaced inwardly over the desired distance. By eliminating the oil pressure in conducting the oil out of the space 21 the key-shaped tightening elements 27 ensure that the rod connection is maintained at the desired bias stress. If the bolts are tightened unequally, there are no consequences for the perpendicular position of the displacer relative to the displacer rod. A post-adjustment, if desired, may be carried out in a simple manner by supplying pressurized oil to the space 21, by subsequently tightening the bolts 28 to the desired extent and by reconducting away the pressurized oil. This connection has the advantage that the displacer 3 can be rigidly connected with the displacer rod 14 without the need for removing the displacer cap 12 from the base element 11, which is even not possible in given structures because they are rigidly connected with each other.

The displacer 3 can be loosened from the displacer rod 14 by supplying pressurized oil to the space 21, by subsequently loosening the bolts 28, so that the key-shaped tightening elements 27 are released and can be displaced outwardly, after which the oil pressure is eliminated and the displacer 3 is turned relatively to the displacer rod 14. Then the nut 18 maintains its place relative to the base element 11 owing to the pin 30 so the displacer rod 14 can be screwed out of the nut 18 without the risk of causing this nut to turn as well.

The seal between the displacer 3 and the cylinder 1 is ensured by two piston rings 31 and 32, each of which is provided at their distal sides with radial grooves 33. These grooves ensure that in operation the minimum pressure of the operating space always prevails in the space 34 between the piston rings 31 and 32. By connecting the space 34 through a channel 35 with the space 36 between the displacer cap 12 and the base element 11, the minimum pressure will also prevail constantly in the space 36, which means that the displacer cap 12 is constantly urged positively to the base element 11.

From the foregoing it will be obvious that the invention provides an interesting and simply post-adjustable connection between the displacer and the displacer rod of a hot-gas piston engine, whilst post-adjustment or release of this connection can be carried out with the need for removing the displacer cap.

What is claimed is:

1. A hot-gas piston engine comprising at least one compression space of variable volume and at least one expansion space communicating with the former and also having a variable volume, said spaces having in operation relatively different temperatures, the volumes of said spaces being variable by piston-like bodies, which are each coupled through a piston rod with a driving gear, in which at least the piston-like body adapted to vary the volume of the expansion space is formed by a base element connected with the end of the piston rod concerned, said base element being provided on its side facing the expansion space with a heat-insulating piston cap, characterized in that the base element is provided with a central bore fitting centrally around part of the piston rod concerned, the side of the base element remote from the piston cap engaging a face of the piston rod at right angles to the centre line of said rod, the piston rod being prolonged in the direction of the piston cap by a narrowed portion which is provided with screwthread at the end, which receives a nut accommodated in a recess of the base element, the nut and the surrounding recess comprising two portions of different diameters, the portions of the larger diameters being located on the side of the piston cap, whilst the otherwise sealed gap-shaped space between the annular faces formed by the transitions of said portions can be caused to communicate with a high-pressure medium source through a connecting channel passing through the base element and the side of the nut remote from the piston cap is provided with a plurality of radial slots distributed along the circumference and having depths decreasing inwardly in a radial direction, each of the key-shaped grooves formed by said slots and the side of the base element facing the piston cap accommodating an associated key-shaped tightening element, which is displaceable in the groove in the radial direction by means of a bolt held in a radial, tapped bore of the base element.

* * * * *